(12) United States Patent
Astrachan (10) Patent No.: US 8,698,961 B2
(45) Date of Patent: Apr. 15, 2014

(54) ENHANCED HISTOGRAM EQUALIZATION

(75) Inventor: Paul M. Astrachan, Austin, TX (US)

(73) Assignee: ViXS Systems, Inc., Toronto, Ontario (CA)

(*) Notice: Subject to any disclaimer, the term of this patent is extended or adjusted under 35 U.S.C. 154(b) by 0 days.

(21) Appl. No.: 13/182,801

(22) Filed: Jul. 14, 2011

(65) Prior Publication Data
US 2011/0285913 A1  Nov. 24, 2011

(51) Int. Cl.
*H04N 5/42* (2006.01)
*G06K 9/68* (2006.01)

(52) U.S. Cl.
USPC .......................... 348/672; 382/168

(58) Field of Classification Search
USPC .......................... 348/672; 382/168
See application file for complete search history.

(56) References Cited

U.S. PATENT DOCUMENTS

| | | | | |
|---|---|---|---|---|
| 5,862,254 A * | 1/1999 | Kim et al. | ...................... | 382/168 |
| 6,018,588 A | 1/2000 | Kim | | |
| 6,038,341 A * | 3/2000 | Takeshima et al. | ............ | 382/168 |
| 6,130,724 A * | 10/2000 | Hwang | .......................... | 348/678 |
| 6,148,103 A * | 11/2000 | Nenonen | ........................ | 382/169 |
| 6,373,533 B1 * | 4/2002 | Kawabata et al. | ............. | 348/672 |
| 6,845,176 B1 | 1/2005 | Sezan | | |
| 7,003,153 B1 * | 2/2006 | Kerofsky | ........................ | 382/168 |
| 7,020,332 B2 * | 3/2006 | Nenonen et al. | ............... | 382/169 |
| 7,102,695 B2 | 9/2006 | Han et al. | | |
| 7,170,566 B2 * | 1/2007 | McGee et al. | ................. | 348/722 |
| 7,248,743 B2 | 7/2007 | Murakami | | |
| 7,289,667 B2 | 10/2007 | Nenonen et al. | | |
| 7,352,410 B2 * | 4/2008 | Chou | ............................. | 348/673 |
| 7,386,181 B2 * | 6/2008 | Murakami | ..................... | 382/251 |
| 7,394,932 B2 * | 7/2008 | Kida et al. | ..................... | 382/169 |
| 7,626,639 B2 | 12/2009 | Yamauchi | | |
| 7,777,816 B2 | 8/2010 | Chang et al. | | |
| 7,865,014 B2 | 1/2011 | Wu et al. | | |
| 7,865,033 B2 * | 1/2011 | Han et al. | ....................... | 382/274 |
| 7,940,333 B2 * | 5/2011 | Suzuki | ........................... | 348/627 |
| 8,009,907 B1 * | 8/2011 | Srinivasan et al. | ............ | 382/168 |
| 8,107,756 B2 * | 1/2012 | Chen et al. | ..................... | 382/254 |
| 8,150,155 B2 | 4/2012 | El-Maleh et al. | | |
| 8,159,616 B2 * | 4/2012 | Norgaard | ....................... | 348/672 |

(Continued)

OTHER PUBLICATIONS

Kim, Taekyung and Paik, Joonki, "Adaptive Contrast Enhancement Using Gain-Controllable Clipped Histogram Equalization," IEEE Transactions on Consumer Electronics, vol. 54, Issue 4, Nov. 2008, pp. 1803-1810.

(Continued)

*Primary Examiner* — Brian Yenke
(74) *Attorney, Agent, or Firm* — Abel Law Group, LLP (57) ABSTRACT

A video processor includes a video stream translation module configured to generate a translated luminance value for a pixel of a current frame of a video data stream. The translated luminance value is based on a first luminance value for the pixel and a first translation matrix for the current frame of the video data stream. The video processor includes a filter configured to generate an output luminance value for the pixel based on the translated luminance value and a target translated luminance value for the pixel. The output luminance value may be based on a weighted average of the translated luminance value and the target translated luminance value using a first weighting factor. The video processor may include a first weighting factor generator configured to generate the first weighting factor based on luminance values of the current frame of the video stream.

18 Claims, 5 Drawing Sheets

(56) References Cited

U.S. PATENT DOCUMENTS

| | | | |
|---|---|---|---|
| 8,174,623 B2* | 5/2012 | Chen et al. | 348/672 |
| 8,295,596 B1* | 10/2012 | Srinivasan et al. | 382/168 |
| 8,335,378 B2* | 12/2012 | Morimoto | 382/168 |
| 2001/0052945 A1* | 12/2001 | Stessen | 348/672 |
| 2004/0001165 A1* | 1/2004 | Shiota et al. | 348/678 |
| 2005/0031201 A1* | 2/2005 | Goh | 382/169 |
| 2005/0200762 A1* | 9/2005 | Barletta et al. | 348/700 |
| 2006/0066756 A1* | 3/2006 | Yamagishi et al. | 348/672 |
| 2007/0183661 A1 | 8/2007 | El-Maleh et al. | |
| 2008/0037866 A1* | 2/2008 | Na | 382/168 |
| 2010/0214478 A1* | 8/2010 | Miyazawa | 348/553 |
| 2010/0245608 A1 | 9/2010 | Trudeau et al. | |
| 2010/0246965 A1 | 9/2010 | Epshtein et al. | |
| 2011/0142282 A1 | 6/2011 | Srikrishnan et al. | |

OTHER PUBLICATIONS

"Histogram equalization," Wikipedia, downloaded Apr. 12, 2011, URL: <http://en.wikipedia.org/wiki/Histogram_equalization> 8 pages.

* cited by examiner

ENHANCED HISTOGRAM EQUALIZATION

BACKGROUND

1. Field of the Invention

This application is related to video processing systems and more particularly to equalization of video signals.

2. Description of the Related Art

In general, histogram equalization is an image-processing technique that adjusts the contrast of an image by redistributing the probability of intensity values. As a result, it changes (e.g., flattens and stretches) the dynamic range of the original image, which increases overall contrast of individual frames of a video stream. However, excessively increasing the contrast does not necessarily produce a video stream that is more visually appealing to a viewer. Instead, the resulting video images may have amplified noise and intensity changes (e.g., oversaturation or undersaturation) that substantially degrade video image quality. Accordingly, techniques that adjust the contrast of a video data stream without substantially enhancing noise or introducing distracting intensity changes are desired.

SUMMARY

In at least one embodiment of the invention, an apparatus includes a video stream translation module configured to generate a translated luminance value for a pixel of a current frame of a video data stream. The translated luminance value is based on a first luminance value for the pixel and a first translation matrix for the current frame of the video data stream. The apparatus includes a filter configured to generate an output luminance value for the pixel based on the translated luminance value and a target translated luminance value for the pixel. In at least one embodiment, the output luminance value is based on a weighted average of the translated luminance value and the target translated luminance value. In at least one embodiment, the apparatus includes a first weighting factor generator configured to generate the first weighting factor based on luminance values of the current frame of the video stream. In at least one embodiment, the apparatus includes a target pixel generator configured to generate the target luminance value based on a target translation matrix and the first luminance value.

In at least one embodiment of the invention, a method includes generating a translated luminance value for a pixel of a current frame of a video data stream. The translated luminance value is based on a first luminance value for the pixel and a first translation matrix for the current frame of the video data stream. The method includes generating an output luminance value for the pixel based on the translated luminance value and a target translated luminance value. In at least one embodiment, the method includes generating the target translated luminance value based on a target translation matrix and the first luminance value. In at least one embodiment of the method, the output luminance value is based on a weighted average of the translated luminance value and the target translated luminance value. In at least one embodiment, the method includes updating a first weighting factor of the weighted average based on luminance values of the current frame of the video stream.

In at least one embodiment of the invention, a tangible computer-readable medium encodes a representation of an integrated circuit that includes a video stream translation module configured to generate a translated luminance value for a pixel of a current frame of a video data stream. The translated luminance value is based on a first luminance value for the pixel and a first translation matrix for the current frame of the video data stream. The integrated circuit includes a filter configured to generate an output luminance value for the pixel based on the translated luminance value and a target translated luminance value for the pixel. In at least one embodiment of the tangible computer-readable medium encoding a representation of an integrated circuit, the integrated circuit includes a target pixel generator configured to generate the target luminance value based on a target translation matrix and the first luminance value. In at least one embodiment of the tangible computer-readable medium encoding a representation of an integrated circuit, the output luminance value is based on a weighted average of the translated luminance value and the target translated luminance value. In at least one embodiment of the tangible computer-readable medium encoding a representation of an integrated circuit, the integrated circuit includes a first weighting factor generator configured to generate a first weighting factor for the weighted average based on luminance values of the current frame of the video stream.

In at least one embodiment of the invention, an apparatus includes a video stream translation module configured to generate a translated luminance value for a pixel of a current frame of a video data stream. The translated luminance value is based on a first luminance value for the pixel and a first translation matrix for the current frame of the video data stream. The apparatus includes a translation matrix generator configured to generate the first translation matrix based on a second translation matrix for a current frame of a video data stream, a prior first translation matrix for a prior frame of the video data stream, and a weighting factor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
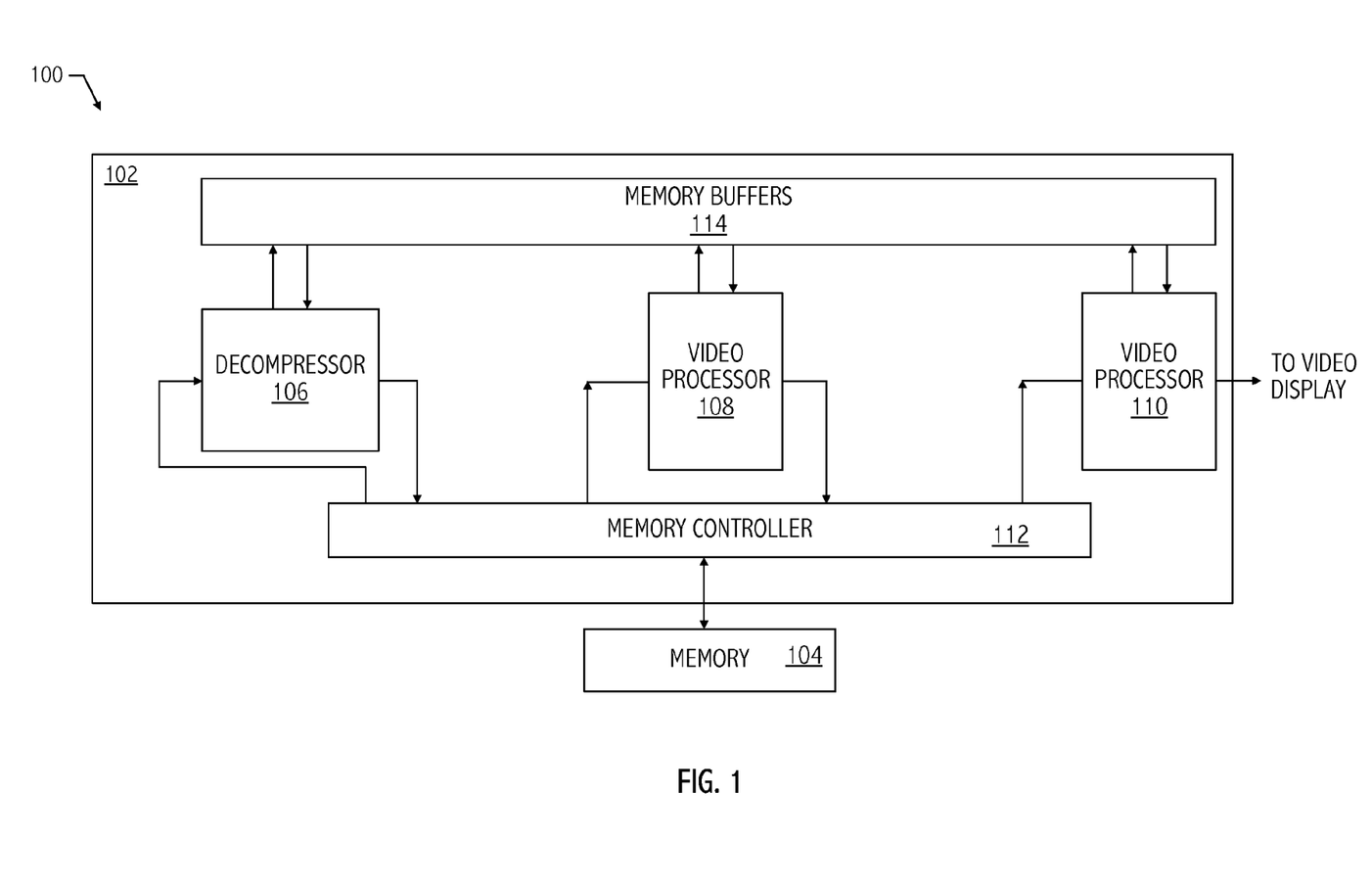
FIG. 1 illustrates a functional block diagram of an exemplary video processing system.

Referring to FIG. 1, an exemplary video system-on-a-chip (SOC) integrated circuit (e.g., video SOC 102) receives one or more streams of video data from an external source via memory 104. For example, the external source writes highly compressed video data to memory 104. A typical decompressor (i.e., decoder or expander, e.g., decompressor 106) decompresses the video data and provides the uncompressed video data to memory controller 112 to write the uncompressed video data to memory 104. Video processors 108 and 110 retrieve the uncompressed video data from memory 104. Video processors 108 and 110 retrieve only portions of an individual frame of the video data at a time. Video processors 108 and 110 may include one or more of a frame rate converter, a display, a deinterlacer, a compositor, a scaler, an edge-enhancement module, a color manipulation module, a face or objection recognition module, a contrast enhancement module, a super resolution scaler, a deblocker, a temporal and/or spatial noise reducer, other suitable video processing modules, or any combination thereof. Video processors 108 and 110 store processed, uncompressed video data back to memory 104 for subsequent use or provide processed video data directly to an on-chip buffer (e.g., memory buffers 114), directly to another video processor, or to an off-chip circuit (not shown).

Although decompressor 106 and video processors 108 and 110 are illustrated as being directly coupled to memory controller 112, in other embodiments of an SOC, decompressor 106 and video processors 108 and 110 are coupled to one or more shared memory buses. A typical memory 104 is a double data rate synchronous dynamic random access memory (i.e., DDR SDRAM memory or DDR memory). In at least one embodiment, memory 104 is a DDR memory compliant with a DDR SDRAM memory standard, DDR2 SDRAM memory standard, DDR3 SDRAM memory standard, other DDR SDRAM memory standard, or other suitable memory standard.

In general, a particular pixel of a frame of a video data stream is typically represented by a luminance (i.e., luma) value (Y) and two chrominance values (i.e., two chroma values, e.g., $C_B$ and $C_R$). For at least one composite video encoding system, the luminance values represent brightness in an image (i.e., the black and white or achromatic portion of the image). The chrominance signal conveys color information of the image separately from the luminance signal.

Figure 2:
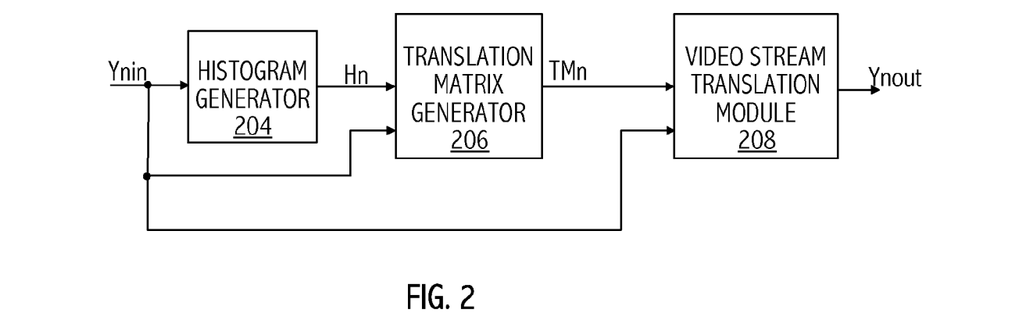
FIG. 2 illustrates an exemplary contrast enhancement module of the video processing system of FIG. 1.

In at least one embodiment video SOC 102, video processor 108 is a contrast enhancement module. Referring to FIG. 2, an exemplary contrast enhancement module (e.g., contrast enhancement module 200) includes a histogram generation module (e.g., histogram generator 204), a translation matrix generation module (e.g., translation matrix generator 206), and a video stream translation module (e.g., image translation module 208). In at least one embodiment, translation generator 206 generates a translation matrix (TMn) based on a histogram of the luminance values of a frame of the video data stream (Hn) provided by histogram generator 204. In at least one embodiment of translation matrix generator 206, the translation matrix is updated periodically (e.g., every frame or every c frames, where c is a predetermined integer) and TMn corresponds to a translation matrix based on the luminance of the nth frame of the video data stream (e.g., luminance values Yin, which has a corresponding histogram, Hn).

In general, if $N_k$ is the number of pixels with luminance $Y_k$, where k ∈[0, L−1], then the probability density function (PDF), $r_k$, is defined as:

$$r_k = N_k/n \text{ for } k=0,1,\ldots,L-1,$$

where $N_k$ represents the number of occurrences of k, and n is the total number of pixels in the input frame of video data and $H(r_k)$ is the histogram of the input image. The cumulative distribution function (CDF) is defined as $$R_k = \sum_{i=0}^{i=k} r_k.$$

Note that a sum of the values of the CDF for k=0, 1, ..., L−1 is 1, based on the normalization of n in the PDF. In general, the input-output relationship for an output luminance value of a histogram equalized frame of video data ($Yout_k$) is:

$$Yout_k = Ymin + (Ymax - Ymin) \times R_k,$$

where Ymin and Ymax set the range of the output luminance values. $Yout_k$ is the output value of a lookup table where Yin is used as the index (k) into the table.

Figure 3A:
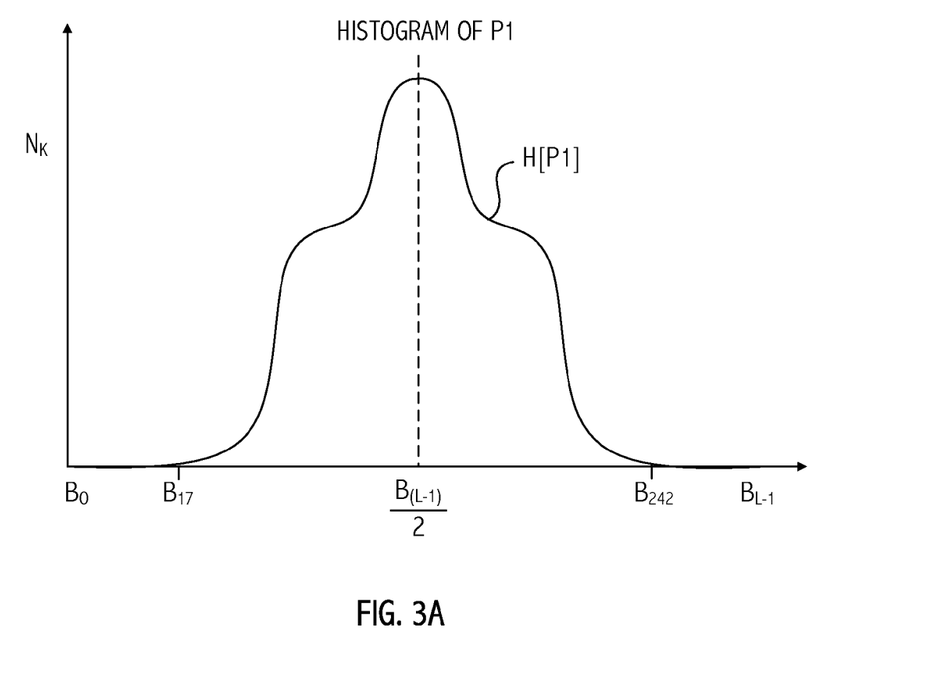
FIG. 3A illustrates a graphical representation of an exemplary probability distribution function of a frame of video data before processing by the contrast enhancement module of FIG. 2.

Referring to FIG. 3A, a histogram of P1 is represented as H[P1], where $N_k$ is the number of pixels of frame n with luminance $Y_k$ and k is an index value from 0 to L−1, where L is equal to the number of possible luminance values in the frame P1, and k corresponds to particular possible luminance values of the video frame Q1. For example, in an embodiment where L is equal to 256, for a value of k equal to 14, $Y_{14}$ represents a luminance value of 14, and $N_{14}$ would represent the number of pixels in a frame having the luminance of 14. For a video frame P1 having L (e.g., 256) possible luminance values from 0 to $B_{L-1}$ (e.g., 255), as indicated by the x-axis values, a particular index value along the x-axis refers to a particular luminance value (i.e., luminance bin or bin). For example, where L=256, there are 256 luminance bins, $B_0$ to $B_{255}$, for a particular frame. The number of pixels of video frame P1 associated with a particular luminance value, or bin, is indicated along the y-axis, (i.e., luminance points, histogram points, or points). An exemplary histogram for a frame of video data (e.g., a 1920×1080 frame) includes 2,073,600 points distributed across the 256 bins. Bins $B_0$-$B_{17}$, and $B_{242}$-$B_{255}$ have few points associated with them, while Bin $B_{135}$ has the most points.

Figure 3B:
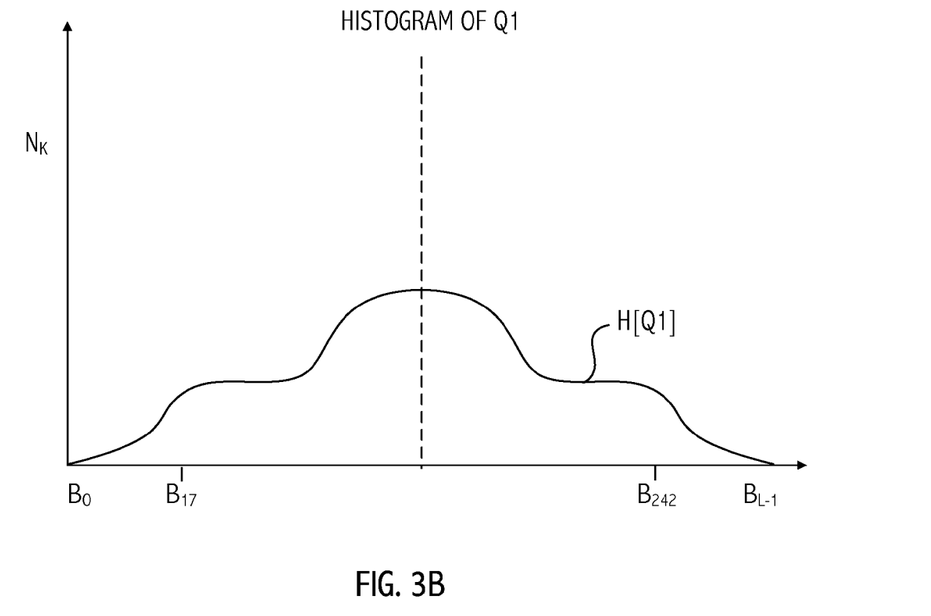
FIG. 3B illustrates a graphical representation of an exemplary probability distribution function of a frame of video data after processing by the contrast enhancement module of FIG. 2.

In at least one embodiment, frame n of video data (e.g., P1) has a translation matrix TMn that is used to generate translated luminance values for a frame of video data (e.g., Q1). That is, Q1=TMn[P1]. Translation module 206 applies the translation matrix to the luminance values of the frame of video data. Referring to FIGS. 3A and 3B, graphs illustrate a histogram H[P1] of the luminance values P1 for the received frame of the video data stream, and a histogram H[Q1] of the equalized (i.e., translated) luminance values Q1 for the frame of the video data stream based upon the histogram of H[P1].

In at least one embodiment, translation matrix generator 206 implements a bi-histogram equalization (BHE) that splits an image into two parts based on a mean intensity of the input frame of video data. In at least one embodiment, translation matrix generator 206 implements a Dual Sub-image Histogram Equalization (DSHE) technique that splits an image into two parts based on a median value of the histogram. Although BHE and DHE increasingly preserve image brightness, the preserved amount of image brightness may be insufficient in some applications. In at least one embodiment, translation matrix generator 206 implements a higher order technique, such as RMSHE, which recursively performs the BHE on progressively smaller sub-images, creating $2^n$ sub-blocks that are individually equalized. The RMSHE technique limits the contrast enhancement and tends to maintain the image brightness of each sub-block. However, as the number of recursions increases, RMSHE approaches null processing (i.e., the output luminance values are substantially the same as the input luminance values). In addition, the number of iterations of RMSHE must be made relatively high to prevent brightness artifacts and significant luminance clustering occurs in areas of low pixel counts.

In at least one embodiment, translation matrix generator 206 implements clipped histogram equalization (CHE) that has reduced brightness artifacts and reduced noise amplification as compared to the techniques described above. Although clipped histogram equalization contrast enhancement is weaker than those other methods (i.e., provides reduced contrast enhancement), CHE is preferable for video processing applications. Variations of CHE allow variable dynamic clipping levels and multiple clipping zones to allow flexibility in creating a luminance translation matrix. In at least one embodiment of contrast enhancement module 200, the clipped histogram technique dynamically controls a clipping level based on a mean brightness of a frame of video data. For example, to reduce noise amplification in dark images, the clipped histogram technique increases a clip ratio.

In at least one embodiment, translation matrix generator 206 implements global clipping to reduce the amount of translation that occurs globally by adding values uniformly to the PDF and subsequent CDF across the entire active luminance range. Sharp peaks in a histogram produce high-sloped regions in corresponding portions of the CDF. Clipping the peaks and re-distributing the associated pixels limit the slope of the CDF, which limits stretching of the luminance levels. In at least one embodiment, translation matrix generator 206 implements local clipping to enhance a region of an image by adding more pixels in a light or dark portion of the image, thereby causing the translation to stretch the dark or light region faster.

In general, histogram equalization techniques change the brightness of an image globally and may result in under-saturation or over-saturation of particular regions of the output images. In at least one embodiment, translation matrix generator 206 generates a translation matrix corresponding to a current frame of the video data stream, (i.e., current translation matrix TMn) based upon a clipped histogram technique that redistributes a predetermined number of luminance values throughout the histogram for a frame of video data. The clipped points are identified based on a clip line of a luminance histogram for a video picture. The location of the clip line is determined based upon a predetermined number of points that indicate a desired number of histogram points to be clipped. The adjusted histogram (i.e., the histogram with the redistributed points) is then used to determine a translation matrix used to translate the received video picture to adjust its contrast. Exemplary techniques for generating the translation matrix are described in U.S. patent application Ser. No. 12/784,793, filed May 21, 2010, entitled "Contrast Control Device and Method Therefor," naming Paul M. Astrachan and Chris A. Aardema as inventors, which application is incorporated herein by reference. However, any suitable technique for generating a translation matrix for histogram equalization of a frame of video data may be used.

Although the techniques described above reduce histogram enhancement to a manageable level, a substantial amount of noise amplification occurs when a translation matrix or luminance values for individual pixels change quickly. In addition, introduction of substantial changes in saturation by histogram equalization techniques from image-to-image of a video stream may be visually unappealing to a viewer.

Figure 4:
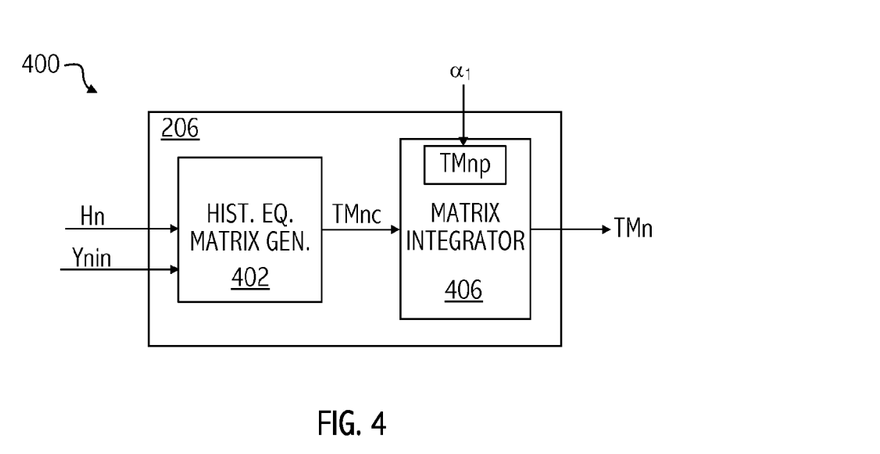
FIG. 4 illustrates a functional block diagram of a translation matrix generator of the contrast enhancement module of FIG. 2 consistent with at least one embodiment of the invention.

In at least one embodiment, contrast enhancement module 200 generates an output stream of luminance values for a video data stream using histogram equalization and additional filtering techniques. Referring to FIG. 4, in at least one embodiment of a contrast enhancement module, translation matrix generator 206 includes a module that generates a translation matrix for histogram equalization (i.e., histogram equalization matrix generator 402 implementing any of the techniques described above, e.g., clipped histogram equalization) and a matrix adjustment module (e.g., matrix integrator 406).

In at least one embodiment, translation module 206 determines the translation matrix based upon a current translation matrix (e.g., TMnc) and a previous translation matrix (e.g., TMnp). The current translation matrix is based solely upon a current frame of video data being processed, while the previous translation matrix is the translation matrix for a previous frame of video data, such as the frame of the video data stream that is displayed immediately prior to the current frame of the video data stream. In at least one embodiment of translation matrix generator 206, the previous frame of video data is based upon a plurality of prior frames of video data. In at least one embodiment of translation module 206, histogram equalization of a current video frame is based on a translation matrix that represents a moving average of a sequence of translation matrices. In at least one embodiment of matrix integrator 406, the translation matrix output by matrix integrator 406 is another combination of a sequence of at least two translation matrices. In at least one embodiment of matrix integrator 406, rather than implementing a moving average of translation matrices, another filter having a different filter response is used to enhance the histogram translation matrix.

In at least one embodiment, matrix integrator 406, generates a translation matrix as follows:

$$TMn[i]=(\alpha_1) \times TMnc[i]+(1-\alpha_1) \times TMnp[i],$$

where TMn[i] is the ith element of the output translation matrix for the nth frame of the video data stream, TMnc[i] is the ith element of the current translation matrix for the nth frame of the video data stream (i.e., TMnc is based on only the luminance values for the nth frame of video data, e.g., based on only the histogram of the current frame of video data), TMnp[i] is the ith element of a prior translation matrix for the nth frame of the video data stream (e.g., the prior output from matrix integrator 406 and used to translate a previous frame of video data), and $\alpha_1$ is a weighting factor for the moving average. In at least one embodiment of matrix integrator 406, TMnp is the current translation matrix for a prior frame of video data, i.e., TMnp is based on only the histogram of the luminance values for a previous frame of video data). One skilled in the art will appreciate that the translation matrix (TMn) or the current translation matrix (TMnc) will become the previous translation matrix TMnp for a next frame of video data. In other words, the translation matrix TMn is a translation matrix used to translate the luminance values for the current frame of video data, and may be based upon a plurality of previous translations matrices, which themselves are based upon a plurality of luminance histograms. In general, $\alpha_1$ is less than or equal to one and is used to weight the translation matrix TMnc relative to the previous translation matrix TMnp.

Figure 5:
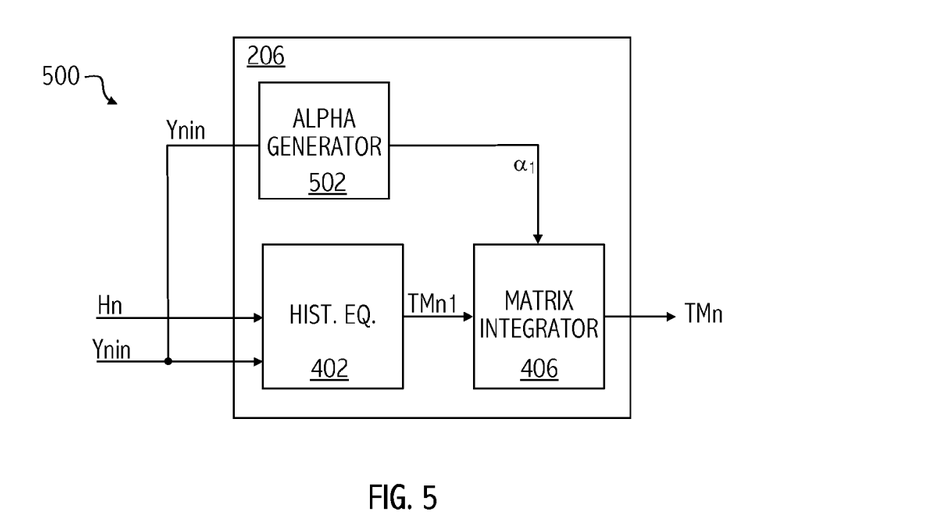
FIG. 5 illustrates a functional block diagram of a translation matrix generator of the contrast enhancement module of FIG. 2, consistent with at least one embodiment of the invention.

In at least one embodiment of matrix integrator 406, $\alpha_1$ is a predetermined value (e.g., 0.5), which may be stored in memory 104 of FIG. 1 or provided by a user. Referring to FIG. 5, in at least one embodiment of matrix integrator 406, $\alpha_1$ is dynamically determined (i.e., determined during steady-state processing of a video stream) by an alpha generator module (e.g., alpha generator 502) based on luminance values of the video stream. In at least one embodiment, matrix integrator 406 generates a value of $\alpha_1$ that is proportional to the mean luminance of a particular frame of video data. For example, since in at least one application, noise is increasingly detectable by a viewer when an image is darker (i.e., has lower luminance), $\alpha_1$ is decreased for a decreased mean luminance value, thereby decreasing the amount of change and noise introduced by applying a current translation matrix. Similarly, for a higher mean luminance value, $\alpha_1$ is increased. In at least one embodiment of alpha generator 502, rather than use the mean luminance of a single frame of a video stream, the median, mode, or other statistical function of the luminance of the particular frame of video data is used to determine $\alpha_1$. In at least one embodiment, alpha generator module 502 generates $\alpha_1$ based on a statistical computation of luminance values for multiple frames of the video stream (e.g., mean, median, mode. In at least one embodiment, alpha generator module 502 generates $\alpha_1$ based on higher order statistics of the luminance. Note that although alpha generator 502 is shown as a separate module, the alpha generation functions may be integrated into other modules. For example, in at least one embodiment of matrix integrator 406, histogram generator 204 may determine the average luminance of a frame of the video data stream and determine a value for $\alpha_1$ based thereon, and provide that value to matrix integrator 406. In at least one embodiment, matrix integrator 406 generates the value of $\alpha_1$. In at least one embodiment, alpha generator 502 is implemented using a general purpose processor (e.g., another video processor of SOC 102) configured to execute software that performs the functions described above).

Figure 6:
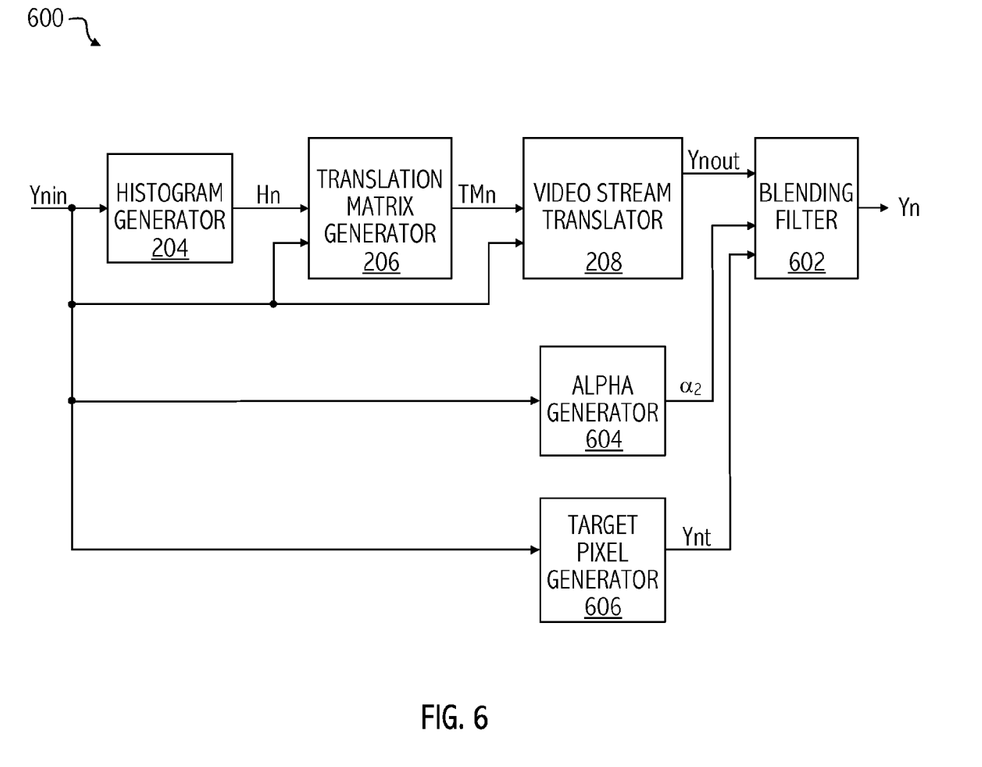
FIG. 6 illustrates a functional block diagram of a contrast enhancement module consistent with at least one embodiment of the invention.

Referring back to FIG. 2, translation matrix generator 206 provides the translation matrix, TMn, which may be stored in memory (e.g., buffer 114 of FIG. 1) and later provided to image translation module 208. Image translation module 208 applies the translation matrix to a current frame of the video data stream to determine a contrast adjusted frame (e.g., Ynout). In at least one embodiment of contrast enhancement module 200, a technique to improve the aesthetics of the video image after histogram equalization (e.g., reduce noise and/or intensity changes) limits the amount that the luminance of the output frame of video data (e.g., Ynout) varies from a corresponding frame of video data prior to histogram equalization (e.g., Ynin). Referring to FIG. 6, in at least one embodiment, contrast enhancement module 200 applies a blending filter to the output of video stream translation module 208. The blending filter blends output luminance values for a frame of video data with target luminance values for the frame of video data (e.g., Ynt). For example, the output of blending filter 602 (Yn) is determined as follows:

$$Yn[i]=(\alpha_2)\times Ynout[i]+(1-\alpha_2)\times Ynt[i],$$

where Ynout[i] is the luminance value of pixel i of a contrast adjusted frame n provided by video stream translation module 208, Ynt[i] is a target luminance value for pixel i of frame n of the video data stream, and $\alpha_2$ is a weighting factor for the blending operation. In general, $\alpha_2$ is less than or equal to one and is used to weight the contrast-adjusted luminance values for frame n relative to the target luminance values for frame n. In at least one embodiment blending filter 602, the target luminance values for an output frame n of the video data stream are the original luminance values for frame n (i.e., Ynt[i]=Ynin[i]). That is, the output luminance values are a weighted average of the contrast-adjusted luminance values and the original luminance values, thereby reducing variation of the luminance from the untranslated luminance values. The amount that the output luminance values approach the target luminance values depends on the value of $\alpha_2$.

In at least one embodiment of blending filter 602, $\alpha_2$ is a predetermined value (e.g., 0.5), which may be stored in memory 104 or provided by a user. In at least one embodiment of blending filter 602, $\alpha_2$ is dynamically determined (i.e., determined during steady-state processing of a video stream) by an alpha generator module (e.g., alpha generator 604) based on luminance values of the video stream. In at least one embodiment, alpha generator module 604 generates a value of $\alpha_2$ that is proportional to the mean luminance of a particular frame of video data. For example, since in at least one application, noise is increasingly detectable by a viewer when an image is darker (i.e., lower luminance), alpha generator 604 decreases $\alpha_2$ in response to a decreased mean luminance value, thereby decreasing the amount of noise introduced by the contrast adjustment process. Similarly, alpha generator 604 increases $\alpha_2$ in response to a higher mean luminance value. In at least one embodiment of alpha generator 604, rather than use the mean luminance of a single current frame of the video stream, alpha generator 604 determines $\alpha_2$ based on the median, mode, or other statistical function of the luminance of the current frame of video data. In at least one embodiment, alpha generator 604 generates $\alpha_2$ based on a statistical computation of luminance values for multiple frames of the video stream (e.g., mean, median, mode, or other function of the luminance values of the current frame of the video data stream and luminance values of at least one prior frame of the video data stream). In at least one embodiment, alpha generator module 604 generates $\alpha_2$ based on higher order statistics of the luminance. In at least one embodiment, alpha generator 604 is implemented using an integrated circuit that is custom-designed to perform the functions described above. In at least one embodiment, alpha generator 604 is implemented using a general purpose processor (e.g., another video processor of SOC 102) configured to execute software that performs the functions described above).

Figure 7:
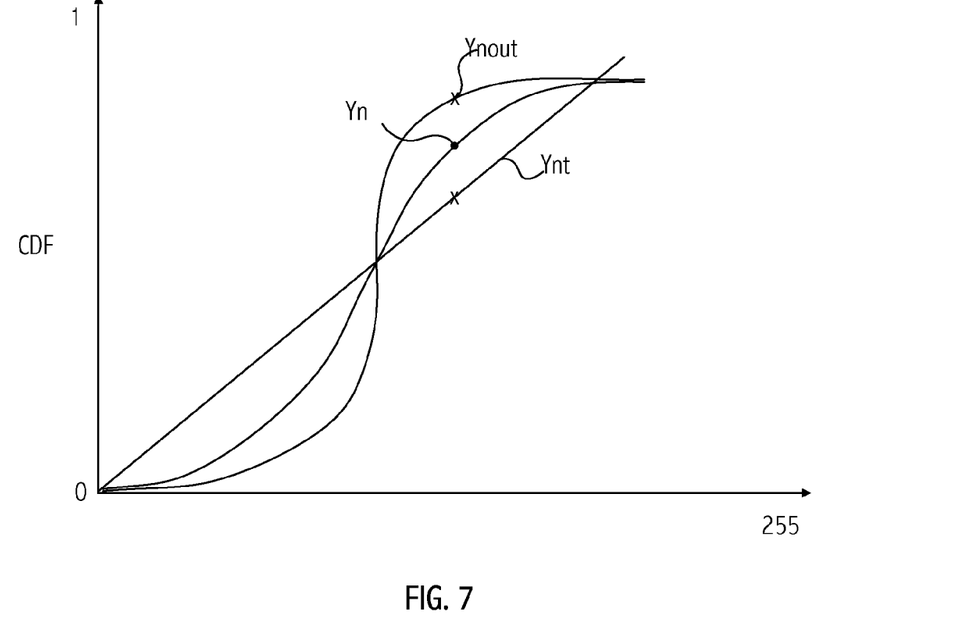
FIG. 7 illustrates a graphical representation of an exemplary blending operation using a linear target translation matrix of a contrast enhancement module consistent with at least one embodiment of the invention.
Figure 8:
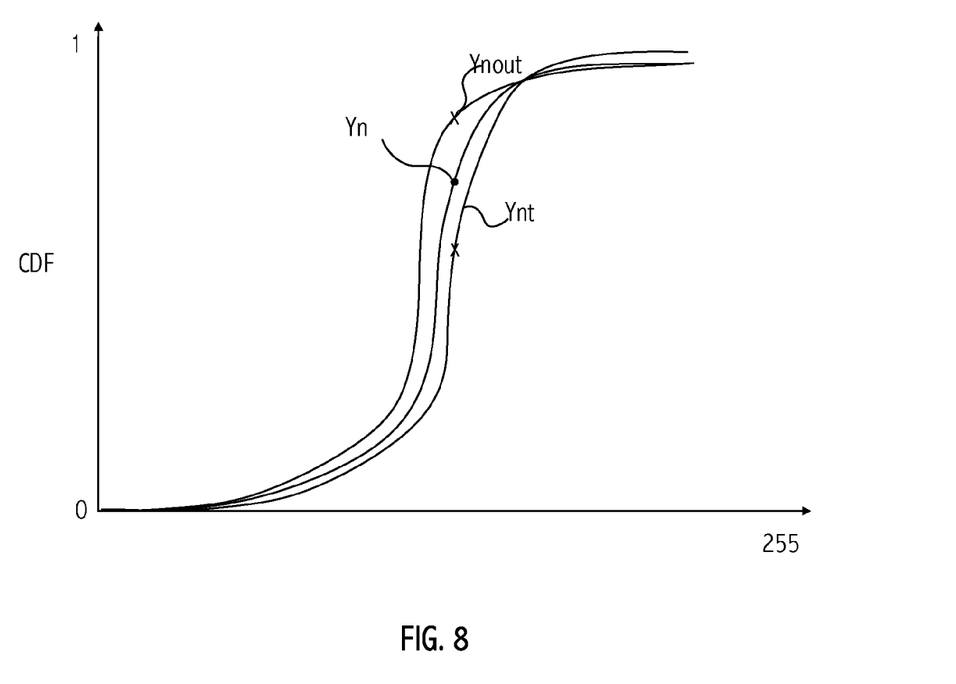
FIG. 8 illustrates a graphical representation of an exemplary blending operation using a non-linear target translation matrix of a contrast enhancement module consistent with at least one embodiment of the invention.

In at least one embodiment of blending filter 602, the target luminance values (Ynt) for the frame of video data may be generated by a target pixel generator module (e.g., target pixel generator 606), based on a target translation matrix (TMnt). Referring to FIG. 7, the target translation matrix may be a linear function, as described above, where the target luminance values are the original luminance values (i.e., the target translation matrix implements a unity multiplier). In another embodiment of blending filter 602, the target translation matrix is another predetermined constant value. Referring to FIG. 8, in at least one embodiment of blending filter 602, the target translation matrix implements a non-linear function. For example, the target translation matrix implements an S-curve that concentrates luminance values within particular bins. Referring back to FIG. 6, in other embodiments rather than use a predetermined target translation matrix, target pixel generator 606 determines the target translation matrix dynamically by any suitable techniques. For example, target pixel generator 606 may select one of a plurality of predetermined translation matrices from memory based on luminance values of the current frame of video data, e.g., for dark scenes, target pixel generator 606 selects a translation matrix that stretches low luminance values, whereas for light scenes, target pixel generator 606 selects a translation matrix that implements an S-curve to increase contrast. In at least one embodiment, target pixel generator 606 selects a translation matrix based on a selected mode of a display included in video system 100. For example, if video system 100 is configured in a particular demonstration mode (e.g., a demonstration mode that increases image contrast or stretches black regions of images), then target pixel generator 606 selects a translation matrix that corresponds to the particular demonstration mode. Target pixel generator 606 applies the target translation matrix to the luminance values for the current frame Ynin, and provides target pixels to blending filter 602.

Thus, various techniques are described for contrast equalization of a frame of a video data stream. Structures described herein may be implemented using software (which includes firmware) executing on a processor included in video processing unit 108 or 110, or by a combination of software and hardware. Software, as described herein, may be encoded in at least one tangible computer-readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which the contrast is enhanced for individual frames of a video data stream, one of skill in the art will appreciate that teachings described herein can be utilized for contrast enhancement of still images. Variations and modifications of the embodiments disclosed herein may be made based on the description set forth herein, without departing from the scope and spirit of the invention as set forth in the following claims.

What is claimed is:

1. An apparatus comprising:
a histogram generator configured to receive luminance values of a current frame of a video data stream and configured to generate a histogram of the luminance values;
a translation matrix generator configured to receive the luminance values and the histogram and configured to generate a first translation matrix for the current frame of the video data stream;
a video stream translation module configured to receive the luminance values and the first translation matrix and configured to generate a translated luminance value for a pixel of the current frame of the video data stream, the translated luminance value being based on a first luminance value for the pixel of the luminance values and the first translation matrix;
a first weighting factor generator configured to receive the luminance values and configured to generate a first weighting factor;
a target pixel generator configured to receive the luminance values and configured to generate a target translated luminance value for the pixel based on a target translation matrix and the first luminance value; and
a filter configured to receive the translated luminance value, the first weighting factor, and the target translated luminance value, and configured to generate an output luminance value for the pixel based on the translated luminance value, and the target translated luminance value.

2. The apparatus, as recited in claim 1, wherein the output luminance value is based on a weighted average of the translated luminance value and the target translated luminance value using the first weighting factor.

3. The apparatus, as recited in claim 1, wherein the first weighting factor is proportional to an average luminance of the current frame of the video data stream.

4. The apparatus, as recited in claim 1, wherein the target translation matrix is a linear function.

5. The apparatus, as recited in claim 1, wherein the target translation matrix is a non-linear function.

6. The apparatus, as recited in claim 1, wherein the translation matrix generator is configured to generate the first translation matrix based on a second translation matrix for the current frame of the video data stream, a prior first translation matrix for a prior frame of data, and a weighting factor.

7. The apparatus, as recited in claim 6, further comprising:
a weighting factor generator configured to generate the weighting factor based on luminance values of the current frame of the video data stream.

8. The apparatus, as recited in claim 7, wherein the weighting factor is a weight of the second translation matrix and the weighting factor is proportional to an average luminance of the current frame of the video data stream.

9. The method, as recited in claim 1, wherein the target translation matrix implements an S-curve function that concentrates luminance values within particular luminance bins.

10. A method comprising:
generating a histogram of luminance values of a current frame of a video data stream;
generating a first translation matrix for the current frame of the video data stream using the histogram and the luminance values;
generating a translated luminance value for a pixel of the current frame of the video data stream, the translated luminance value being generated using a first luminance value for the pixel of the luminance values and the first translation matrix;
generating a first weighting factor using the luminance values;
generating a target translated luminance value for the pixel using a target translation matrix and the first luminance value; and
generating an output luminance value for the pixel based on the translated luminance value, the target translated luminance value for the pixel, and the first weighting factor.

11. The method, as recited in claim 10, wherein the output luminance value is based on a weighted average of the translated luminance value and the target translated luminance value using the first weighting factor.

12. The method, as recited in claim 11, further comprising:
updating the first weighting factor based on luminance values of the current frame of the video stream.

13. The method, as recited in claim 12, wherein the first weighting factor is proportional to an average luminance of the current frame of the video data stream.

14. The method, as recited in claim 10, wherein the target translation matrix is a linear function of the luminance values.

15. The method, as recited in claim 10, wherein the target translation matrix is a non-linear function of the luminance values.

16. The method, as recited in claim 10, further comprising:
generating the first translation matrix based on a second translation matrix for the current frame of the video data stream, a prior first translation matrix for a prior frame of data, and a weighting factor.

17. The method, as recited in claim 16, further comprising:
generating the weighting factor based on luminance values of the current frame of the video stream.

18. The method, as recited in claim 17, wherein the weighting factor is a weight of the second translation matrix and the weighting factor is proportional to an average luminance of the current frame of the video data stream.

* * * * *